307-425

XR 3,636,356

[15] 3,636,356

Giordmaine [45] Jan. 18, 1972

[54] APPARATUS AND METHOD FOR ELIMINATING FREQUENCY MODULATION FROM MODULATED LIGHT

[72] Inventor: Joseph A. Giordmaine, Summit, N.J.

[73] Assignee: Bell Telephone Laboratories Incorporated, Berkeley Heights, N.J.

[22] Filed: Dec. 27, 1968

[21] Appl. No.: 787,516

[52] U.S. Cl. ....250/199, 307/88.3, 332/46

[51] Int. Cl. ....H04b 9/00

[58] Field of Search ....250/199; 307/88.3; 321/69; 329/205, 206; 330/4, 4.3, 4.5; 331/94.5; 332/7.51, 46, 52; 350/150, 151, 160, 161; 325/65

[56] References Cited

UNITED STATES PATENTS 1,678,163 7/1928 Peterson ....332/46

1,998,119 4/1935 Cox ....332/46

2,616,033 10/1952 Adler ....332/46

3,309,526 3/1967 Giordmaine ....330/4.5

3,371,220 2/1968 Fleury et al ....307/88.3

*Primary Examiner*—Robert L. Richardson
*Assistant Examiner*—Albert J. Mayer
*Attorney*—R. J. Guenter and Arthur J. Torsiglieri

[57] ABSTRACT

The proposed apparatus and method removes the frequency modulation from an incident light beam having an arbitrary combination of amplitude and frequency modulation, and produces a purely amplitude modulated beam with an envelope simply related to the envelope of the incident beam. The apparatus comprises a third order nonlinear system for producing an output signal with amplitude proportional to the amplitude product of the square of the incident beam and a second purely sinusoidal local oscillator beam. This output beam contains the amplitude modulation information of the incident beam but does not contain any of the frequency modulation. The third order nonlinear system may include simply a single crystal such as strontium titanate or alternatively a more complex system of phase-matched difference and sum frequency generators.

24 Claims, 5 Drawing Figures

INVENTOR
J. A. GIORDMAINE
BY
[signature]
ATTORNEY

APPARATUS AND METHOD FOR ELIMINATING FREQUENCY MODULATION FROM MODULATED LIGHT

BACKGROUND OF THE INVENTION

This invention relates to apparatus and method for processing modulated light and, more particularly to apparatus and method for separating the amplitude modulation information from an optical signal which includes both frequency and amplitude modulation.

One of the most promising uses of the laser is in the field of communication where the large bandwidths available at optical frequencies represent virtually unlimited information carrying capabilities. Information may be impressed upon an optical beam by well-known amplitude or frequency-modulation techniques. If, for example, amplitude modulation is chosen, it is possible that nonlinearities in the transmission system will generate spurious frequency modulation in the amplitude modulated optical carrier. This spurious modulation may be considered a form of noise which it would be desirable to separate from the amplitude modulation information. Typically this separation takes place at a remote receiver.

Environments other than a communication system, however, are also plagued with the problem of spurious FM being impressed upon an AM signal. In the laboratory, for example, certain lasers such as the self-pulsed Nd:glass laser generate a complex output waveform which is partially amplitude modulated and partially frequency modulated. To analyze the modulation effects, as well as the self-pulsing mechanism, it is desirable to remove the FM component, leaving only an AM output. The spectrum of the AM output would be considerably more narrow than that of the original signal.

It is, therefore, a broad object of the present invention to remove the frequency modulation from a signal having an arbitrary combination of amplitude and frequency modulation.

It is a more specific object of the present invention to remove the frequency modulation from an optical signal having an arbitrary combination of amplitude and frequency modulation.

SUMMARY OF THE INVENTION

These and other objects of the invention are accomplished in a method and apparatus in accordance with an illustrative embodiment of the invention which removes the frequency modulation from an incident light beam having an arbitrary combination of amplitude and frequency modulation, and produces a purely amplitude modulated beam with an envelope simply related to the envelope of the incident beam. The apparatus comprises a third order nonlinear system for producing an output signal with amplitude proportional to the amplitude product of the square of incident beam and a second purely sinusoidal local oscillator beam. This output beam contains the amplitude modulation information of the incident beam but does not contain any of the frequency modulation. The third order nonlinear system may include simply an appropriate single crystal, such as strontium titanate, or, alternatively, a more complex system of phase-matched difference and sum frequency generators.

Although the invention will be described with reference to signals at optical frequencies, it is to be understood that the principles involved apply equally as well to other frequency bands, e.g., microwave.

BRIEF DESCRIPTION OF THE DRAWINGS

The invention and its objects, together will its various features and advantages, can be easily understood with reference to the following more detailed discussion taken in conjunction with the accompanying drawings, in which.

DETAILED DESCRIPTION

Figure 1:
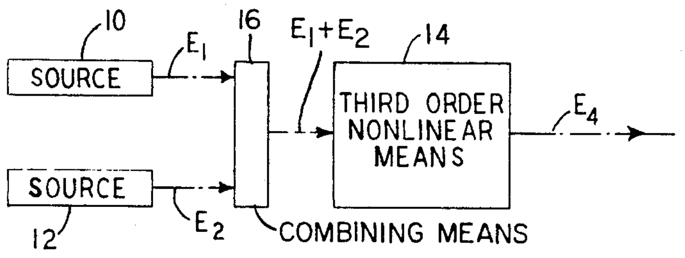
FIG. 1 is a block diagram of a general embodiment of the invention.

Turning now to FIG. 1, there is shown a block diagram of a general embodiment of the invention comprising a third order nonlinear system which generates an output signal $E_4(t)$ which is proportional to the amplitude product of the square of an unknown complex signal $E_1(t)$ generated by source 10 (which might include a transmission system but is shown in block diagram form for simplicity) and a purely sinusoidal local oscillator signal $E_2(t)$ generated by source 12. $E_1(t)$ is given by $$E_1(t)=E_1 f_a(t)\sin[\omega_1 t+\sum_m M_m \sin\omega_m t] \quad (1)$$

where $E_1$ is the peak value of $E_1(t)$ unmodulated, $f_a(t)$ is the amplitude modulation envelope, $\omega_m$ are the Fourier components of the frequency-modulation signal, and $M_m$ are the modulation indices characteristic of each component of the frequency modulation. By the "square" of $E_1(t)$ is meant the components of $[E_1(t)]^2$ near zero frequency; that is, the component remote from the harmonic frequency $2\omega_1$. On the other hand, $E_2(t)$ is a CW signal given by $$E_2(t)=E_2\sin\omega_2 t. \quad (2)$$

It can readily be shown by mathematical computation that the output signal contains a component $E_4(t)$ which is proportional to $E_1^2 E_2$; that is, $$E_4(t)=\frac{E_1^2E_2f_a^2(t)}{4}\sin\omega_2 t \quad (3)$$

which contains only the amplitude modulation $f_a(t)$ of $E_1(t)$ but is free of the frequency modulation of $E_1(t)$, as desired.

Figure 2A:
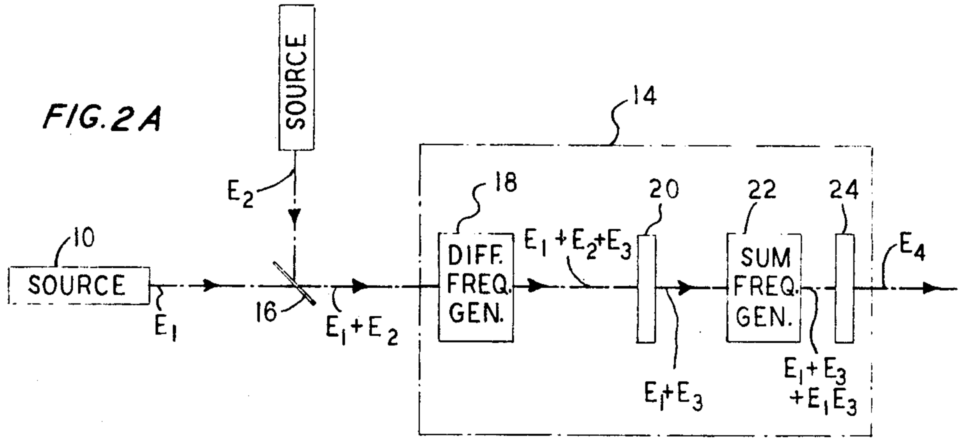
FIGS. 2A and 2B are schematics of illustrative embodiments of the invention using sum and difference frequency generators.

In an illustrative embodiment shown in FIG. 2A, it will be assumed that all of the signals are optical signals. The principles of the invention apply equally as well to signals in other frequency ranges however. The complex signal $E_1(t)$ and the CW signal $E_2(t)$ are combined via partially transmissive reflector 16 to produce the sum $E_1(t)+E_2(t)$ which is applied to input of third-order nonlinear means 14 which comprises a difference frequency generator (DFG) 18, a filter 20, a sum frequency generator (SFG) 22 and a filter 24 disposed in tandem in the order recited. The sum signal $E_1(t)+E_2(t)$ applied to DFG 18 generates a signal $E_3(t)$ whose center frequency is $\omega_3=\omega_2-\omega_1$; that is, $$E_3(t)=\frac{E_2E_1f_a(t)}{2}\cos[(\omega_2-\omega_1)t-\sum_m M_m\sin\omega_m t] \quad (4)$$

The output of DFG 18, which is $E_1(t)+E_2(t)+E_3(t)$, is then passed through filter 20 which rejects $E_2(t)$, leaving $E_1(t)+E_3(t)$ which are applied to the input of SFG 22. The filter 20 of this embodiment is typically a grating spectrometer, an interference filter, or a color glass filter. The exact type of filter used, however, depends on the frequencies involved. Alternatively, $E_2(t)$ in the output of DFG 18 may be eliminated by combining the output with a component of $E_2(t)$ derived from source 12 and made to be 180° out of phase with the component in the output of DFG 18. Of course, appropriate timing and amplitude of the 180° component are desirable to produce destructive interference. This technique is employed in the embodiment of FIG. 3B but, for simplicity, is not shown here. The output of SFG 22 contains the product of its input signals (i.e., $E_1(t)$ $E_3(t)$ as well as the input signals themselves). The product $E_1(t)$ $E_3(t)$ it is to be noted is equal to $E_1^2()$ $E_2(t)$, the desired third order nonlinear output. This signal is passed through filter 24 which rejects signals at $\omega_1$, i.e., $E_1(t)$ and signals at $(\omega_2-\omega_1)$, i.e., $E_3(t)$, but transmits at $\omega_2$, i.e., transmits the sum frequency component of $E_1(t)E_3(t)$, which is $E_4(t)$ at frequency $\omega_2$ given by equation (3). Typically, DFG 18 and SFG 22 comprise phase-matched noncentrosymmetric crystals as will be described hereinafter.

Figure 2B:
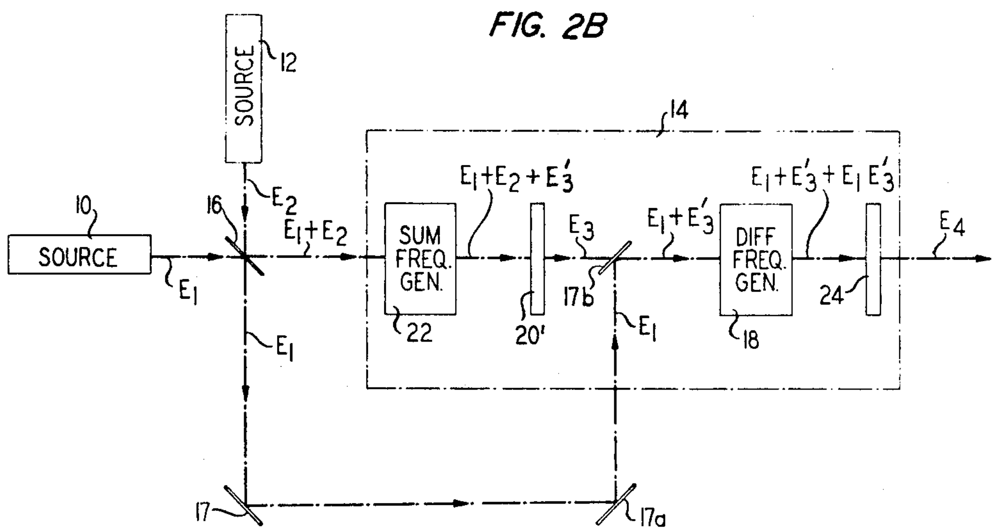

Alternatively, as shown in FIG. 2B, the output $E_4(t)$ is generated by reversing the order of sum and difference frequency generation. As before, $E_1(t)$ and $E_2(t)$ are combined via partially transmissive reflector 16 to produce the sum $E_1(t)+E_2(t)$ which is applied to the input of SFG 22. The output of SEG 22 is the sum $E_1(t)+E_2(t)+E_3(t)$, where the sum frequency component $E_3(t)+E_1(t)\ E_2(t)$ corresponds to equation (4) with $(\omega_2+\omega_1)$ substituted for $(\omega_2-\omega_1)$ and the sign before the summation changed to plus. Filter 20 transmits only $E_3(t)$ which is then recombined with $E_1(t)$ via mirror system **17–17*a*–17*b*. However, as in FIG. 2A, a filter 20 could be used which transmits both $E_1(t)$ and $E_3(t)$, in which case the mirror system would be omitted. The sum signal $E_1(t)+E_3(t)$ is then applied to the input of DFG 18, the output of which is $E_1(t)+E_3(t)+E_1(t)E_3(t)$. Filter 24** transmits only the product component which is $E_4(t)$, equation (3),.

Illustratively, $E_1(t)$ is a 1.064$\mu$ pulse and $E_2(t)$ is a 1.15$\mu$ CW signal, the former being generated by a Nd:glass laser and the latter by a He-Ne laser. As mentioned previously, DFG 18 and SFG 22 in an optical system are preferably phase-matched noncentrosymmetric crystals. The SFG 22 of FIG. 2B is typically a $LiNbO_3$ crystal having its optic axis in the plane of the paper and set at the phase-matching angle of about 72° to the direction of propagation of $E_1(t)$ and $E_2(t)$ which are polarized perpendicular to the plane of the paper. The sum frequency signal $E_3(t)$ is then at 5,52 1A. and is polarized in the plane of the paper and normal to the polarizations of $E_1(t)$ and $E_2(t)$. Thus, filter 20 may be an infrared absorbing filter (e.g., glass) which transmits only $E_3(t)$ at 5,521 A. The DFG 18 could also be a $LiNbO_3$ crystal set at the same phase-matching angle.

Another useful crystal is ammonium dihydrogen phosphate (ADP), the phase-matching angle of which is about 44° for $E_1(t$ generated, again, at 1.06$\mu$ by a Nd:glass laser and $E_2(t)$ generated at 6,943 A. by a ruby laser. The sum frequency signal $E_3(t)$ would then be at 4,195 A.

Figure 3A:
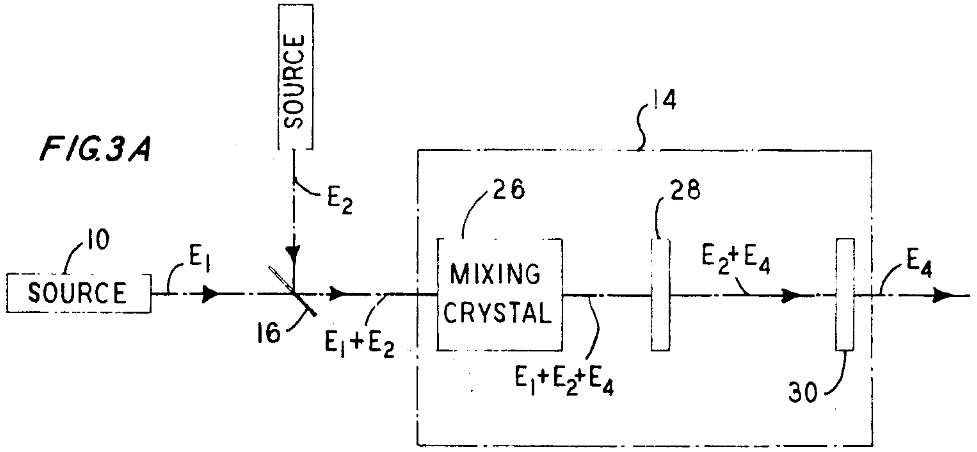
FIGS. 3A and 3B are schematics of embodiments of the invention using a single isotropic mixing medium.

In another embodiment as shown in FIG. 3A, the sum signal $E_1(t)+E_2(t)$ may be applied to the input of a third order nonlinear system 14 comprising a signal third-order nonlinear mixing crystal 26 (e.g., $SrTiO_3$ or an isotropic medium such as a glass or liquid), a frequency filter 28 and a polarizing filter 30 disposed in tandem in the order recited. The local oscillator signal $E_2(t)$ will typically be polarized at an angle of 45° to the polarization direction of $E_1(t)$. In operation, the crystal 26 generates directly the signal $E_4(t)$, equation (3) and filter 28 transmits signals at $\omega_2$, i.e., $E_2(t)$ and $E_4(t)$ but rejects signals at $\omega_1$, i.e., $E_1(t)$. Since both $E_2(t)$ and $E_4(t)$ are at frequency $\omega_2$ they cannot be separated by a conventional frequency filter. However, $E_4(t)$ generally has a component of polarization at 90° to the polarization direction of $E_1(t)$, hence a polarizing filter 30 which rejects the polarization of $E_2(t)$ but transmits the polarization of $E_4(t)$ will effectively separate the two.

Figure 3B:
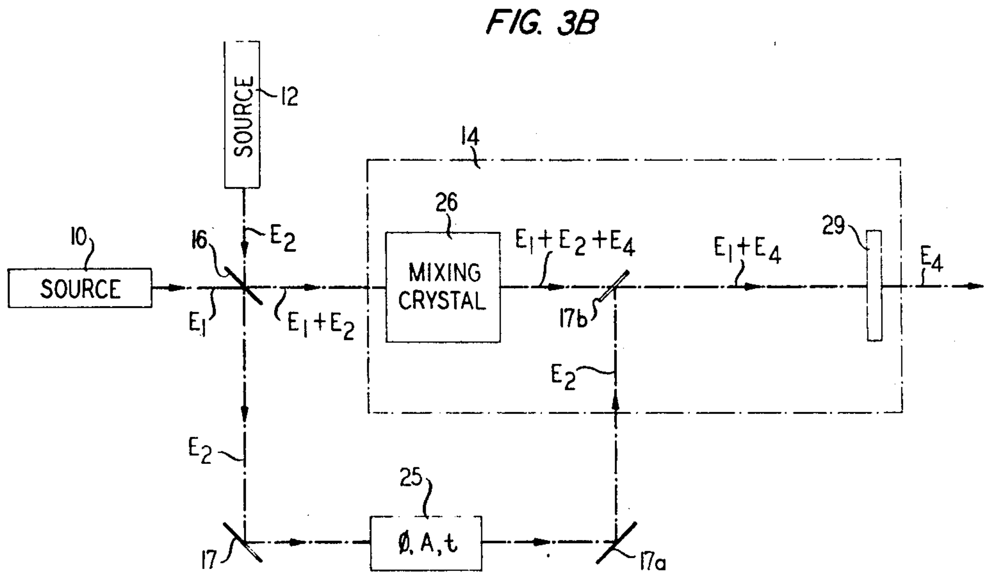

An alternative arrangement may also be utilized, however, as shown in FIG. 3B. The output of the crystal is $E_1(t)+E_2(t)+E_4(t)$ each of which have the same polarization. $E_2(t)$ is eliminated by destructive interference by combining that output with a component of $E_2(t)$ 180° out of the phase with itself. Proper phase, amplitude and synchronization are achieved by any technique well known in the art, generally designed as 25. Thus, the sum $E_1(t)+E_4(t)$ is applied to frequency filter 29 which transmits only the desired signal $E_4(t$.

What is claimed is:

1. Apparatus for separating amplitude modulation information from a first optical signal of frequency $\omega_1$ containing both frequency and amplitude modulation comprising
   - means for generating an unmodulated sinusoidal second optical signal of frequency $\omega_2$,
   - means for combining said first and second signals so as to produce the sum signal thereof, and
   - third-order nonlinear means disposed to receive said sum signal for producing as a third-order nonlinear output signal the intermodulation product at frequency $\omega_2$ and with amplitude proportional to the amplitude product of the second signal and the square of the first signal, said third-order nonlinear means including at least one nonlinear optical device oriented and adapted to suppress inherently all other intermodulation products and including filtering means for blocking the remnants of the input signals in the output of said nonlinear optical device,
   - whereby the output signal of said third-order nonlinear means is amplitude modulated in accordance with the amplitude modulation of the first signal but free of the frequency modulation of said first signal.

2. The apparatus of claim 1 wherein said third-order nonlinear means comprises
   - means for generating a third signal of frequency equal to the difference of the frequencies of said first and second signals and proportional to the amplitude product of the said first and second signals, and
   - means for generating a fourth signal of frequency $\omega_2$ and with amplitude proportional to the amplitude product of said first and third signals, said fourth signal containing the amplitude modulation of said first signal but being free of the frequency modulation of said first signal.

3. The apparatus of claim 2 wherein said means for generating said fourth signal comprises a sum frequency generator.

4. The apparatus of claim 1 wherein said third order nonlinear means comprises
   - means for generating a third signal of frequency $(\omega_2+\omega_1)$ and with amplitude proportional to the amplitude product of said first and second signals, and
   - means for generating a fourth signal of frequency $\omega_2$ and with amplitude proportional to the amplitude product of said first and third signals, said fourth signal containing the amplitude modulation of said first signal but being free of the frequency modulation of said first signal.

5. The apparatus of claim 4 wherein said means for generating said fourth signal comprises a difference frequency generator.

6. The apparatus of claim 1 wherein said third order nonlinear means comprises
   - a difference frequency generator, said sum signal being applied to the input thereof so as to generate at its output the sum of said first and second signals plus a third signal of frequency equal to the difference of the frequencies of said first and second signals and with amplitude proportional to the sum of the amplitude product of said first and second signals,
   - a first frequency filter for rejecting said second signal at frequency $\omega_2$, but transmitting said first and third signals,
   - a sum frequency generator, said first and third signals transmitted by said first filter being applied to the input thereof so as to generate at its output the sum of said first and third signals plus a fourth signal at frequency $\omega_2$ proportional to the amplitude product of said first and third signals, and
   - a frequency filter for separating said fourth signal from said first and third signals, said fourth signal containing the amplitude modulation of said first signal but being free of the frequency modulation of said first signal.

7. The apparatus of claim 3 wherein
   - said difference frequency generator comprises a first noncentrosymmetric crystal set at the phase-matching angle to the direction of propagation of the optical signal applied thereto so as to generate a difference frequency signal, and
   - said sum frequency generator comprises a second noncentrosymmetric crystal set at phase-matching angle to the direction of propagation of the optical signals applied thereto so as to generate a sum frequency signal.

8. The apparatus of claim 5 wherein
   - said difference frequency generator comprises a first noncentrosymmetric crystal set at the phase-matching angle to the direction of propagation of the optical signal applied thereto so as to generate a difference frequency signal, and sum frequency generator comprises a second noncentrosymmetric crystal set at phase-matching angle to the direction of propagation of the optical signals applied thereto so as to generate a sum frequency signal.

9. The apparatus of claim 6 wherein said difference frequency generator comprises a first noncentrosymmetric crystal set at the phase-matching angle to the direction of propagation of the optical signal applied thereto so as to generate a difference frequency signal, and said sum frequency generator comprises a second noncentrosymmetric crystal set at phase-matching angle to the direction of propagation of the optical signal applied thereto so as to generate a sum frequency signal.

10. The apparatus of claim 7 wherein said first signal is at a wavelength of 1.06$\mu$, said second signal is at a wavelength of 1.15$\mu$ and said first and second crystals comprise lithium niobate set at about a 72° phase-matching angle to the direction of propagation of the signals applied thereto.

11. The apparatus of claim 8 wherein said first signal is at a wavelength of 1.06$\mu$, said second signal is at a wavelength of 1.15$\mu$ and said first and second crystals comprise lithium niobate set at about a 72° phase-matching angle to the direction of propagation of the signals applied thereto.

12. The apparatus of claim 9 wherein said first signal is at a wavelength of 1.06$\mu$, said second signal is at a wavelength of 1.15$\mu$ and said first and second crystals comprise lithium niobate set at about a 72° phase-matching angle to the direction of propagation of the signals applied thereto.

13. The apparatus of claim 7 wherein said first signal is at a wavelength of 1.06$\mu$, said second signal is at a wavelength of 6,943 A., and said first and second crystals comprise ammonium dihydrogen phosphate set at about a 44° phase-matching angle to the direction of propagation of the signals applied thereto.

14. The apparatus of claim 8 wherein said first signal is at a wavelength of 1.06$\mu$, said second signal is at a wavelength of 6,943 A., and said first and second crystals comprise ammonium dihydrogen phosphate set at about a 44° phase-matching angle to the direction of propagation of the signals applied thereto.

15. The apparatus of claim 9 wherein said first signal is at a wavelength of 1.06$\mu$, said second signal is at a wavelength of 6,943 A., and said first and second crystals comprise ammonium dihydrogen phosphate set at about a 44° phase-matching angle to the direction of propagation of the signals applied thereto.

16. The apparatus of claim 1 where said third-order nonlinear means comprises a third-order nonlinear medium, the sum of said first and second signals being applied to the input thereof so as to generate directly a third signal at frequency $\omega_2$ and with amplitude proportional to the amplitude product of said second signal and the square of said first signal, the output of said medium also containing said first and second signals, a frequency filter for rejecting said first signal and transmitting said second signal and said third signal both of which are at frequency $\omega_2$, but are of different polarizations, and a polarizing filter for transmitting only said third signal which contains the amplitude modulation of said first signal but is free of the frequency modulation of said first signal.

17. The apparatus of claim 16 wherein said medium comprises a strontium titanate crystal and said second signal is polarized at an angle of about 45° to the polarization of said first signal.

18. The apparatus of claim 1 wherein said third-order nonlinear means comprises a third-order nonlinear isotropic medium, the sum of said first and second signals being applied to the input thereof so as to generate directly a third signal at frequency $\omega_2$ and with amplitude proportional to the amplitude product of said second signal and the square of said first signal, the output of said medium also containing said first and second signals, a frequency filter for rejecting said first signal and transmitting said second signal and said third signal both of which are at frequency $\omega_2$, and means for causing the destructive interference of the component of said second signal in said output, thereby leaving only said third signal which contains the amplitude modulation of said first signal but is free of the frequency modulation of said first signal.

19. A method of separating amplitude modulation information from a first optical signal of frequency $\omega_1$ containing both frequency and amplitude modulation comprising the steps of generating an unmodulated sinusoidal second optical signal of frequency $\omega_2$, combining said first and second signals so as to produce the sum signal thereof, directing said sum signal into apparatus producing as a third-order nonlinear output signal the intermodulation product at frequency $\omega_2$ with amplitude proportional to the amplitude product of the second signal and the square of the first signal, said apparatus including at least one nonlinear optical device oriented and adapted to suppress inherently all other intermodulation products and including filtering means for blocking the remnants of the input signals in the output of said nonlinear optical device, whereby the output signal of said third-order nonlinear device is amplitude modulated in accordance with the amplitude modulation of said first signal but free of the frequency modulation of said first signal.

20. A method of separating amplitude modulation information from a first optical signal of frequency $\omega_1$ containing both frequency modulation and amplitude modulation comprising the steps of generating an unmodulated sinusoidal second optical signal of frequency $\omega_2$, combining said first and second signals so as to produce the sum signal thereof, directing said sum signal into a difference frequency generator so as to generate a third signal at frequency equal to the difference of the frequencies of said first and second signals, and with amplitude proportional to the amplitude product of said first and second signals, and directing said first and third signals into a sum frequency generator so as to generate a fourth signal at frequency $\omega_2$ with amplitude proportional to the amplitude product of said first and third signals, said fourth signal containing the amplitude modulation of said first signal but being free of the frequency modulation of said first signal.

21. A method of separating amplitude modulation information from a first optical signal of frequency $\omega_1$ containing both frequency modulation and amplitude modulation comprising the steps of generating an unmodulated sinusoidal second optical signal of frequency $\omega_2$, combining said first and second signal so as to produce the sum signal thereof, directing said sum signal into a sum frequency generator so as to generate a third signal at frequency $\omega_1+\omega_1$ and with amplitude proportional to the amplitude product of said first and second signals, and directing said first and third signals into a difference frequency generator so as to generate a fourth signal at frequency $\omega_2$ and with amplitude proportional to the amplitude product of said first and third signals, said fourth signal containing the amplitude modulation of said first signal but being free of the frequency modulation of said first signal.

22. A method of separating amplitude modulation information from a first optical signal of frequency $\omega_1$ containing both frequency modulation and amplitude modulation comprising the steps of generating an unmodulated sinusoidal second optical signal of frequency $\omega_2$, and combining said first and second signal so as to produce the sum signal thereof, directing said sum signal into a third-order nonlinear medium so as to generate a third signal at frequency $\omega_2$ and with amplitude proportional to the amplitude product of the second signal and the square of the first signal, said third signal containing the amplitude modulation of said first signal but being free of the frequency modulation of said first signal.

23. The method of claim 22 wherein said medium also transmits said second signal at frequency $\omega_1$ but of different polarization than that of said third signal, in combination with the additional steps of frequency filtering out said first signal and directing said second and third signals into a polarizing filter which transmits only said third signal.

24. The method of claim 22 wherein said medium also transmits said second signal at frequency $\omega_2$ and of the same polarization as that of said third signal, in combination with the additional steps of frequency filtering out said first signal and eliminating said second signal by destructive interference.

* * * * *